United States Patent [19]

Ishii et al.

[11] Patent Number: 4,496,063

[45] Date of Patent: Jan. 29, 1985

[54] METHOD OF HANDLING SLABS BY AN OVERHEAD TRAVELING CRANE PROVIDED WITH A SLAB GRIP LIFTER

[75] Inventors: Sugao Ishii; Susumu Itou, both of Chiba; Mikio Kawamura, Ichihara; Tadashi Tsukamoto, Chiba, all of Japan

[73] Assignee: Kawasaki Steel Corporation, Hyogo, Japan

[21] Appl. No.: 436,058

[22] Filed: Oct. 22, 1982

[30] Foreign Application Priority Data

Oct. 27, 1981 [JP] Japan ................................ 56-172597

[51] Int. Cl.3 ....................... B66C 17/00; B66C 17/06; B65G 3/00; B65G 9/04

[52] U.S. Cl. .................................... 212/270; 212/213; 212/221; 414/786; 414/626

[58] Field of Search ................................ 212/205-206, 212/209, 212-213, 220-221, 160, 171, 270; 414/542, 786, 560, 561, 606, 618, 621, 627, 626

[56] References Cited

U.S. PATENT DOCUMENTS

| | | | |
|---|---|---|---|
| 909,804 | 1/1909 | Kendall | 212/212 |
| 1,729,891 | 10/1929 | Moore | 212/206 |
| 2,388,408 | 11/1945 | Harry | 212/212 |
| 3,244,291 | 4/1966 | Dexter | 212/213 |
| 3,247,974 | 4/1966 | Dechantsreiter | 212/212 |
| 3,771,666 | 11/1973 | Fournier | 212/212 |
| 3,929,231 | 12/1975 | Cook | 212/213 |
| 3,972,420 | 8/1976 | Stock et al. | 212/220 |
| 4,261,609 | 4/1981 | Kraszewski et al. | 414/621 |
| 4,266,904 | 5/1981 | Fadness | 212/220 |

FOREIGN PATENT DOCUMENTS

| | | | |
|---|---|---|---|
| 1756103 | 4/1970 | Fed. Rep. of Germany | 212/213 |
| 47704 | 4/1977 | Japan | 212/213 |
| 206825 | 8/1967 | U.S.S.R. | 212/206 |
| 261225 | 11/1970 | U.S.S.R. | 212/213 |
| 683988 | 9/1979 | U.S.S.R. | 212/205 |

*Primary Examiner*—Trygve M. Blix
*Assistant Examiner*—R. B. Johnson
*Attorney, Agent, or Firm*—Parkhurst & Oliff

[57] ABSTRACT

A method of handling slabs by an overhead traveling crane having a slab grip lifter comprises disengaging a brake for a lifter swinging motor and a brake for a crab moving motor in the beginning, causing the position of the lifter to be adjusted by a reaction force from a slab when the lifter grips the slab, and causing the lifter to return to its original position after it has gripped the slab.

1 Claim, 6 Drawing Figures

METHOD OF HANDLING SLABS BY AN OVERHEAD TRAVELING CRANE PROVIDED WITH A SLAB GRIP LIFTER

BACKGROUND OF THE INVENTION

1. Field of the Invention

This invention relates to a method of handling slabs by an overhead traveling crane provided with a slab grip lifter.

2. Description of the Prior Art

Slabs manufactured by a continuous casting line are usually conveyed by a conveyor roller table to a piler delivery table, and piled in a slab yard by an overhead traveling crane having a slab grip lifter. A stack of 10 to 15 slabs is formed in each zone of the slab yard having an address designated in accordance with the nature of the slabs, for example, the subsequent process, the necessity of surface repair, and the manufacturing strand.

Attempts have been made to employ a computer system for the automatic remote control of an overhead traveling crane to accomplish the handling of slabs automatically without relying on any manpower. For the automatic handling of slabs, it is important to ensure that slabs be gripped firmly, and piled without any positional deviation between upper and lower slabs. These attempts have, however, not hitherto met any practical success, partly because of the inability to grip slabs firmly.

For example, if a slab S conveyed by a conveyor roller table to a prescribed position has a centerline $L_s$ disposed at an angle to the centerline $L_l$ of a lifter 2 on an overhead traveling crane moved to the prescribed position to grip the slab S, only a pair of diagonally disposed pawls 1 on the lifter contact the lateral surfaces of the slab S, and the other pair of diagonally disposed pawls 1 do not contact them, as shown in FIG. 1. If the longitudinal centerline $L_s$ of the slab S does not coincide with the centerline $L_l$ of the lifter, though they are parallel to each other, only the two pawls 1 on one side of the lifter contact the adjacent lateral surface of the slab S, and the other two pawls 1 remain spaced apart from the slab S, as shown in FIG. 2.

In either event, however, a powder clutch, which is provided on the lifter to prevent any greater force from acting on the slab brought into contact with any of the pawls, functions to transmit a signal indicating that the slab has been gripped. A powder clutch is a type of electromagnetic clutch which is made by using magnetic material (e.g., iron powder) as a coupling between the input and output rotatable disks in the clutch. A powder clutch is conventional and well known in the art. The clutch functions to transmit driving torque from a motor to a grapple device which may include a lifter, lifter arms and pawls. The lifter is used to grip and lift slabs from different positions in a slab yard.

The lifter is lowered over a slab until the pawls on the lifter arms contact the slab. The lifter is connected to a motor by means such as a rotatable shaft. When the pawls of the lifter contact the slab a reaction force f of the slab against the lifter arms is transmitted to sprocket wheels and a chain through the lifter arms. This force slows the rotation of the rotatable shaft and finally stops its rotation. The moment the shaft stops rotating, a limit switch, for detecting a stop in rotation of the shaft, transmits a signal to turn off the source of power to the motor. Alternatively, the limit switch can break the circuit connected to the source of power to the motor, and thereby stop the motor from turning the shaft when the pawls firmly engage with the slab. As a result, there is every likelihood of the slab S falling from the lifter under the situation shown in FIG. 1, and the lifter cannot grip the slab S under the situation shown in FIG. 2.

Therefore, it has hitherto been essential that a man stay in the slab yard to position the lifter to suit the slab, and give a sign for the hoisting of the lifter after making sure that all of the four pawls of the lifter contact the lateral surfaces of the slab.

SUMMARY OF THE INVENTION

It is an object of this invention to ensure that a slab be gripped firmly, without the necessity of having any man stay in a slab yard, even if the slab conveyed by a conveyor roller table to a prescribed position in the slab yard is somewhat inclined relative to a lifter, or has a longitudinal centerline deviating from the centerline of the lifter.

DETAILED DESCRIPTION OF THE INVENTION

The invention will now be described by way of example with reference to FIGS. 3 to 6 of the drawings.

Figure 3:
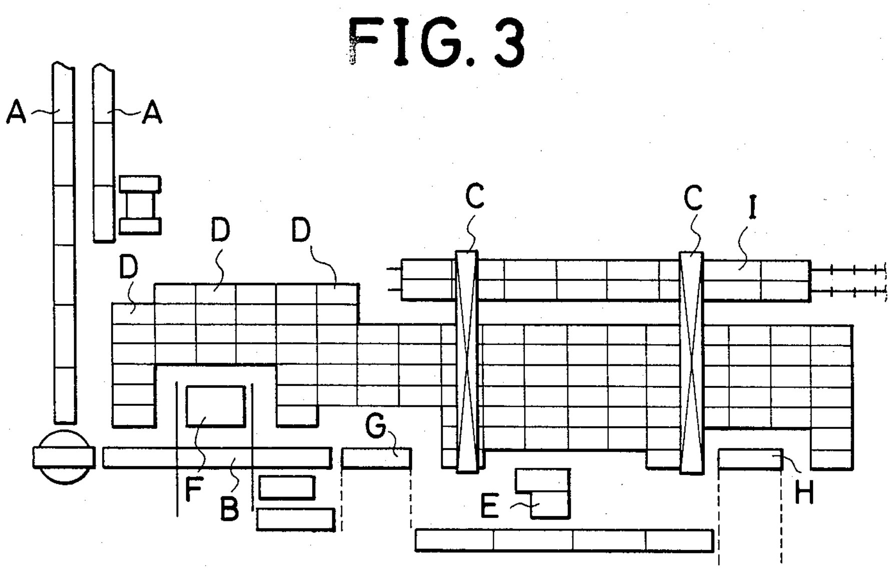
FIG. 3 is a schematic top plan view of a slab yard in which this invention is employed.

Referring first to FIG. 3, there is shown a slab yard schematically in top plan. Slabs, which are manufactured, for example, by a continuous casting line, are delivered by a conveyor roller table A to a piler delivery table B, and conveyed and piled in a stack of 10 to 15 slabs in each zone D of the slab yard by an overhead traveling crane C having a slab grip lifter, and controlled remotely by a computer system. As is well known to those of skill in this art, the computer system can move crane C transversely to a prescribed position or "address" in the slab yard. The computer system can control the method of handling the slabs, i.e., it can lower lifter 2 disposed on crane C. to a prescribed position, for instance, over a delivery table B, and it can control the opening and closing of lifter arms 2*a* around a slab S. Further, it can raise the lifter, rotate the lifer, move crane C to a predetermined "address" or position in the slab yard while holding slab S with lifter 2; and deposit slab S at the selected "address" or position in the slab yard.

The slab yard can be laid out on, for instance, an x-y coordinate system. Each point in the slab yard can have an "address" that corresponds to a pair of x-y coordinates. An operator can select a specific pair of x-y coordinates; enter the selected coordinates into the computer system. The computer system can then direct crane C to the position indicated by the selected coordinates. Each zone D of the slab yard has a particular pair of x-y coordinates as its "address". The slabs are piled in different areas in zone D in accordance with the nature of the slabs, for example, the process to which they are delivered subsequently from the slab yard, the necessity of surface repair, and the manufacturing strand. The crane C is monitored by an operator in a control room E on the ground. The address of each zone D of the slab yard is on file in a computer. A traverser F, roller table cars G and H, and a transfer car I are also shown in FIG. 3.

Figure 4:
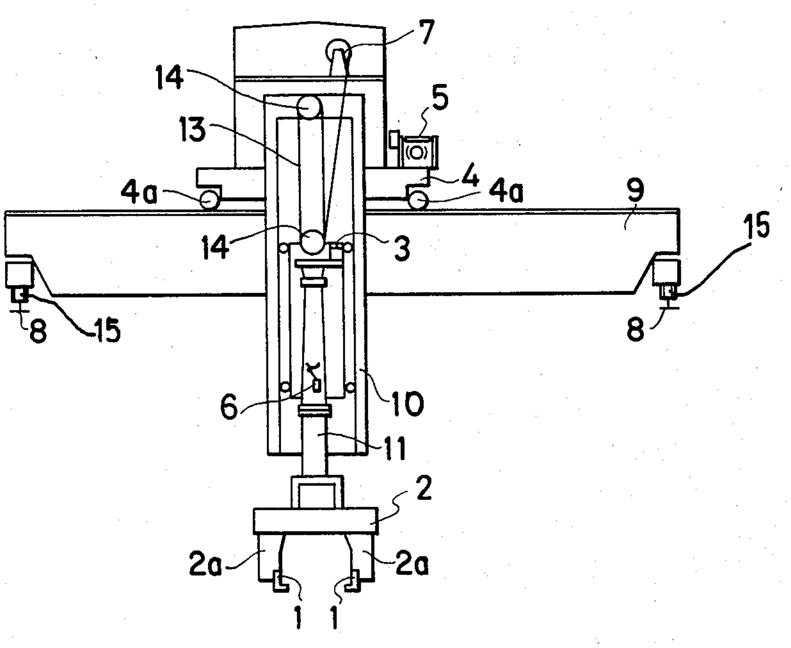
FIG. 4 is a schematic front elevation view of an overhead traveling crane employed to carry out the method of this invention.

Refering to FIG. 4, there is shown a preferred embodiment of the overhead traveling crane in accordance with the present invention. The crane C has a slab grip lifter 2 provided with lifter arms 2*a* having pawls 1, a brake 3 for a motor (not shown) for swinging the lifter 2, a crab 4, a brake 5 for a motor for moving the crab 4 (not shown), a limit switch 6 for controlling the swinging motion of the lifter 2, and a motor 7 for lowering and raising the lifter 2 over slabs in the slab yard. The lifter 2 is connected to a mast 11. Mast 11 is vertically slidable within a cylindrical member 10. Mast 11 can be moved relative to member 10 by motor 7 with wire ropes 13 and drums 14. Mast 11 is rotatable in a transverse direction across crane C by the lifter swinging motor (not shown). Mast 11 is attached to the crab 4 and the motor 7 for lowering and raising the lifter 2. Crab 4 has four wheels 4*a* for moving along a girder 9, for instance, in a transverse direction across a crane C. Girder 9 can move along overhead tracks 8 on wheels 15 in a conventional manner in the slab yard.

The lifter has four laterally spaced apart pawls 1 disposed on laterally spaced apart lifter arms. The two front pawls 1 are actuated into their open or closed position synchronously by one motor, while the two rear pawls 1 are likewise actuated into their open or closed position synchronously by another motor. Each pawl 1 is provided with a powder clutch which prevents any greater force from acting on the slab S after the pawls 1 have been brought into their closed position, and gripped the slab. The operation of the pawls 1, and the brakes 3 and 5 is electrically remotely controlled from the control room E, or automatically controlled by a computer system.

Figure 5:
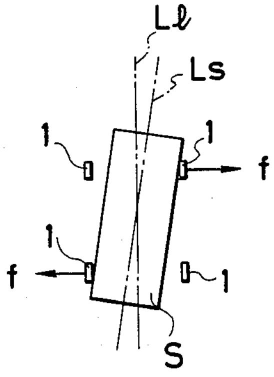
FIGS. 5 and 6 are views illustrating the handling of a slab by the method of this invention.
Figure 6:
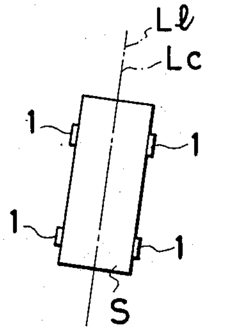

The automatic, remote handling of the slab by the overhead traveling crane C may be achieved as will hereinafter be described. The motor 7 is actuated to lower the lifter 2 onto the slab S, while the brake 3 for the lifter swinging motor and the brake 5 for the crab moving motor are both disengaged. The motors for actuating the pawls 1 are driven to bring the pawls 1 into their closed position. If the slab S is inclined relative to the lifter 2 as shown in FIG. 5, the lifter 2 receives a reaction force f from the slab S through its pawls 1 contacting the slab S, and the force f causes the lifter 2 to rotate clockwise in FIG. 5. A force of, say, 1.5 tons is sufficient for rotating the lifter 2, while the slab S usually weighs at least five tons. The lifter 2 is, therefore, rotated to the full extent which is required, and its position relative to the slab S is automatically corrected. All of the pawls 1 of the lifter 2 contact the lateral surfaces of the slab S as shown in FIG. 6, so that the slab S may be gripped firmly.

Figure 1:
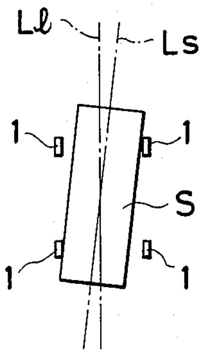
FIG. 1 is a view illustrating a slab in an inclined position relative to a lifter.
Figure 2:
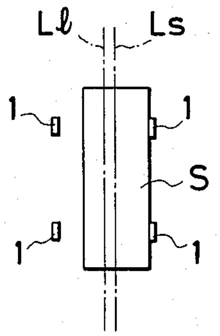
FIG. 2 is a view illustrating a slab having a centerline deviating from that of a lifter.

In the event only the pawls 1 on one side of the lifter 2 have first been brought into contact with the lateral surface of the slab S as shown in FIG. 2, the lifter 2 also receives a reaction force from the slab S. Since the brake 5 for the crab moving motor is disengaged, this force effects the automatic correction of the lifter position, so that the four pawls 1 may contact the lateral surfaces of the slab S, and grip it firmly.

When the slab S has been gripped firmly, a reaction force f of the slab S against the pawls 1 and lifter arms 2*a* is detected and the motor for the lifter arms 2*a* stops actuating. When the motor for the lifter arms 2*a* stops actuating, brakes 3 and 5 are engaged and the motor 7 is activated to raise the lifter 2 towards girder 9. In the event the lifter 2 has gripped the slab S in an inclined position as shown in FIG. 6, it has a centerline disposed at an angle to its original position. If this angle is over a certain level (for example, 1°), the limit switch 6 transmits a signal to disengage the brake 3, and cause the lifter swinging motor to rotate in a reverse direction, whereby the lifter 2 is rotated in a reverse direction into its original position, for which the limit switch is also provided. After the lifter 2 has, thus, been returned to its original position, the brake 3 is engaged.

In the event the lifter 2 has gripped a slab S having a centerline which is in parallel to, but spaced apart from that of the lifter 2 as shown in FIG. 2, the lifter 2, and hence, the crab 4 stay in a position displaced from their original position. The wheels of the crab 4 are provided with a detector which detects any such displacement of the crab 4. In response to the output of the detector, the brake 5 is disengaged, and the crab moving motor is driven to return the crab 4 to its original position. The lifter 2 is, thus, returned to its original position, and then, the brake 5 is engaged.

Such correction of the lifter position is effected after the lifter 2 has been raised, or when the slab S is piled, so that the slab S may be piled on a lower slab or slabs without any positional deviation therefrom.

As is obvious from the foregoing description, this invention ensures the automatic positioning of the lifter to grip a slab properly without calling for any man stationed on the ground, even if the slab may be somewhat inclined relative to the lifter, or have a longitudinal centerline deviating from that of the lifter, and the automatic correction of the position taken by the lifter to grip the slab. It is, thus, possible to prevent any positional deviation of the slab when it is piled on a lower slab or slabs, and therefore, eliminate any manpower from the slab handling operation.

What is claimed is:

1. A method for handling slabs with an overhead traveling crane which includes a device for gripping and lifting a slab, said device comprising a crab disposed on and movable along a movable girder of said crane, a crab moving means, a brake for said crab moving means, a rotatable vertically movable lifter, a lifter swinging means, a brake for said lifter swinging means, at least two laterally spaced apart lifter arms on said lifter, at least two laterally spaced apart pairs of pawls on said lifter arms, means for actuating said lifter arms and brakes for said lifter arm actuating means, said method being especially adapted for lifting a slab which has a centerline angled relative to a centerline of said lifter or which has a centerline deviating from a centerline of said lifter, said method comprising the sequential steps of:

moving said crab and lifter into a position substantially above the slab to be gripped;

lowering said lifter onto the slab to be gripped;

actuating, with said brake for said lifter swinging means and said brake for said crab moving means disengaged, said lifter arms containing said two laterally spaced apart pairs of pawls with said lifter arm actuating means, so that two pawls contact said centerline angled or deviated slab and further actuating said lifter arms to adjust the position of said lifter by a reaction force from said slab so that both of said two pairs of pawls of said lifter arms contact said slab and grip it firmly;

detecting a lack of motion of said lifter arms;

stopping said lifter arm actuating means when a lack of motion of said lifter arms is detected;

engaging said brakes for said lifter arm actuating means so that said lifter can be raised for subsequent operations;

vertically moving said lifter with said slab; and moving at least one of said crab and said girder to transfer said slab to a second position.

* * * * *